United States Patent [19]
Rochester et al.

[11] Patent Number: 5,167,382
[45] Date of Patent: Dec. 1, 1992

[54] INSIDE PAYOUT OPTICAL FIBER CANISTER HAVING REDUCED ADHESIVE IN THE OPTICAL FIBER PACK

[75] Inventors: James R. Rochester, Tucson, Ariz.; Ronald B. Chesler, Woodland Hills, Calif.

[73] Assignee: Hughes Aircraft Company, Los Angeles, Calif.

[21] Appl. No.: 791,303

[22] Filed: Nov. 12, 1991

Related U.S. Application Data

[63] Continuation-in-part of Ser. No. 686,081, Apr. 16, 1991, Pat. No. 5,104,057, which is a continuation-in-part of Ser. No. 430,699, Nov. 1, 1989, Pat. No. 5,052,636.

[51] Int. Cl.⁵ .................... F41G 7/32; F42B 12/68; F42B 15/04; B65H 55/00
[52] U.S. Cl. .................... 244/3.12; 89/1.34; 102/504; 242/171
[58] Field of Search ............ 242/159, 170–175; 89/1.34; 102/504; 244/3.12

[56] References Cited

U.S. PATENT DOCUMENTS

| | | | |
|---|---|---|---|
| 2,709,553 | 5/1955 | Wellcome | 242/171 |
| 2,720,309 | 10/1955 | Kimball | 242/170 |
| 4,326,657 | 4/1982 | Arpin et al. | 102/504 |
| 4,467,916 | 8/1984 | Hedden et al. | 242/172 |
| 4,553,707 | 11/1985 | Henrich | 242/159 |
| 4,903,607 | 2/1990 | Clark | 244/3.12 |
| 4,925,125 | 5/1990 | LeCompte | 242/159 |
| 4,967,980 | 11/1990 | Pinson | 244/3.12 |
| 5,035,169 | 7/1991 | Chapin et al. | 89/1.34 |
| 5,069,398 | 12/1991 | Tegel et al. | 244/3.12 |
| 5,100,078 | 3/1992 | Clark | 242/171 |

FOREIGN PATENT DOCUMENTS

| | | | |
|---|---|---|---|
| 311122 | 5/1929 | United Kingdom | 242/171 |
| 407786 | 3/1934 | United Kingdom | 242/171 |

Primary Examiner—David H. Brown
Attorney, Agent, or Firm—R. M. Heald; C. D. Brown; W. K. Denson-Low

[57] ABSTRACT

An optical fiber canister (90) comprises a hollow housing (102) and an optical fiber pack (98) having a plurality of layers of optical fiber (20) supported on an inner surface of the housing (102) with a free end (96) of the optical fiber (20) positioned to pay out from an interior surface of the fiber pack (98). The optical fiber (20) of the optical fiber pack (98) has an amount of adhesive thereon ranging from zero to an amount sufficient to produce a peel force of less than about 2 grams. There is desirably a support layer (110) of a castable elastomeric material between the inner wall (108) of the hollow housing (102) and the outer surface of the optical fiber pack (98), and a release layer of a release material such as polytetrafluoroethylene between the inner surface of the support layer (110) and the outer surface of the optical fiber pack (98).

19 Claims, 4 Drawing Sheets

INSIDE PAYOUT OPTICAL FIBER CANISTER HAVING REDUCED ADHESIVE IN THE OPTICAL FIBER PACK

This application is a continuation-in-part of copending application Ser. No. 07/686,081, filed Apr. 16, 1991, for which U.S. Pat. No. 5,104,057 was issued on Apr. 14, 1992 for which priority is claimed, which in turn is a continuation-in-part of copending application Ser. No. 07/430,699, filed Nov. 1, 1989, for which U.S. Pat. No. 5,052,636 was issued on Oct. 1, 1991, for which priority is claimed.

BACKGROUND OF THE INVENTION

The present invention relates generally to an optical fiber dispenser for a missile or other moving vehicle, and, more particularly, to an inside payout optical fiber canister.

A guided missile may remain interconnected with control apparatus upon launch by an optical fiber, over which navigational information is exchanged during at least a part of the missile travel path. The optical fiber is typically wound into an optical fiber pack carried in a canister on the missile or other vehicle, and care must be taken in the manner of paying out (dispensing) the optical fiber to avoid damaging the optical fiber.

One difficulty encountered on dispensing an optical fiber from a wound optical fiber pack, especially at the high payout speeds required for many missiles, is the tendency for the filament to form helical loops of relatively large amplitude extending transversely to the dispensing direction. Such large loops of optical fiber can produce tangling or snarling of the optical fiber, leading to breaking of the optical fiber. The presence of such large loops can also have indirect adverse consequences on the missile through their influence on its design. Large helical loops of paid out optical fiber are generally incompatible with the mounting of the engine (air breathing or rocket) in the tail of the missile, because the aft-directed engine exhaust plume is likely to impinge upon and damage the optical fiber as it swings widely behind the missile. It is therefore necessary to mount the engines in the sides of the missile, which is less efficient than a tail-mounted engine. The helical pattern traced by the optical fiber also requires a large exit port in the optical fiber canister, and prevents ducting of the optical fiber. Yet another result is that the radar cross-section of the missile (i.e., detectability) is larger than desired.

It is, therefore, highly desirable to provide an optical fiber payout technique ideally producing a linear trajectory, allowing dispense from a small exit port or duct. Payout should be accomplished without subjecting the filament to significant risk of damage, destruction or reduction in signal transmission capabilities.

SUMMARY OF THE DISCLOSURE

The present invention provides an optical fiber canister that provides linear payout of the optical fiber through a small opening or duct, with minimal stress applied to the optical fiber. A long length of the optical fiber can be passed through a small opening or duct during payout. Significantly, the optical fiber canister is very stable during extended term storage over a range of temperatures, and does not experience the changes in payout characteristics after extended storage observed in prior optical fiber canisters. Reliability of the optical fiber canister is thereby improved, and quality control made easier. The canister of the invention is fully compatible with the use of an aft-mounted engine, yielding higher efficiency for the missile and its propulsion system.

In accordance with the invention, an optical fiber canister comprises a hollow housing, and an optical fiber pack comprising a plurality of layers of optical fiber supported upon an inner surface of the housing and having an end of the optical fiber positioned to pay out from an interior surface of the optical fiber pack. The optical fiber of the optical fiber pack has an amount of adhesive thereon ranging from zero to an amount sufficient to produce a peel force of less than about 2 grams.

The optical fiber canister of the invention is an inside payout design, wherein the optical fiber pack is wound on the interior surface of the canister housing. The optical fiber pack is supported from the pack's outer surface and the optical fiber pays out from the interior surface of the optical fiber pack. This combination of an inside payout canister and the dispensing of an optical fiber (as distinct from other types of fiber-like structures) from the canister provides a unique opportunity for modifying the canister design due to the characteristics of the payout and the material properties of the optical fiber.

Based upon the experience of outside payout canisters, it has been the practice with inside payout canisters to apply an adhesive to the optical fiber as it is wound to form the optical fiber pack. The adhesive is applied directly to the optical fiber or to layers of the optical fiber after the layers are wound onto the optical fiber pack. The adhesive has been viewed as necessary to maintain the integrity of the optical fiber pack and to prevent the payout of multiple turns at once, which can lead to snagging and failure of the optical fiber. The amount of adhesive typically applied is sufficient to produce a peel force of 5–10 grams during payout of the optical fiber.

The present invention departs from the prior canister design by providing that the amount of adhesive used with an inside payout canister be much smaller than the amount which produces a peel force of 5–10 grams. This large amount of adhesive, previously thought necessary to retain integrity of the optical fiber pack, can result in unduly large forces on the optical fiber that may cause it to break.

Large amounts of adhesives on the optical fiber can have adverse effects on the payout of the optical fiber in other ways. For example, an important trend in some missile systems is to conduct the payed out optical fiber from the canister to some remote location through a duct or tube. If the engine of the missile is located in the tail of the missile, the optical fiber may be ducted to a laterally displaced location such as the tip of a control surface to prevent it from being damaged in the exhaust plume of the engine. When there is a large amount of adhesive on the optical fiber, that adhesive can rub off on the inside of the duct and eventually partially or completely clog the duct toward the end of the mission, at its most critical point. As the duct becomes fully clogged with scraped-off adhesive, the drag force on the optical fiber increases sharply, and the failure of the optical fiber becomes more likely.

According to the present invention, the amount of adhesive is from 0 up to an amount sufficient to produce a peel force of up to about 2 grams. Surprisingly, it has been found that the inside payout canister configuration requires little or no adhesive to maintain structural integrity of the optical fiber pack and prevent multiple turn payouts.

The reduced amount of adhesive is possible because of the unique characteristics of optical fibers, as compared with wires, braided wires, wire cables, ropes, and other types of fiber-like structures that have been dispensed from canisters. An optical fiber has a central glass strand surrounded by a relatively compliant buffer layer of organic material. The optical fiber is also small in diameter, typically about 250 micrometers (about 0.010 inches) in diameter. The optical fiber has a higher stiffness, due to the presence of the glass strand and the small diameter of the optical fiber, and does not flex as readily as do wires, braided wires, wire cables, ropes, and the like. The compliant buffer provides frictional force against contacting turns of the optical fiber.

The optical fiber is also brittle, so that if bent to too small a radius it will snap. The peel force determines the bend radius at the peel point: the higher the peel force, the sharper the bend radius. A substantial reduction in the peel force increases the bend radius and reduces the likelihood of optical fiber failure near the peel point.

When the optical fiber is used in an inside payout configuration, the stiffness of the optical fiber aids in retaining the optical fiber in its inside-wound configuration due to the high restoring stress resulting from the bent shape, as does the compliant buffer of the optical fiber in contact with adjacent turns. These mechanical property characteristics of an optical fiber also aid in the high speed payout—at over 100 meters per second, and sometimes as high as 800 meters per second—characteristic of dispensing the optical fiber from a canister in a missile flying through the air. Such high speed payout produces optical fiber kinetic energies tens of times higher than experienced for payout at low speeds.

The operable range of adhesive from no adhesive to an amount producing a peel force of up to 2 grams may be divided into two physically distinct and significant regimes. The complete absence of adhesive, zero adhesive, relies entirely upon the physical characteristics of the optical fiber to retain the integrity of the optical fiber pack and resist multiple-turn payouts. This regime has the advantage that there is no adhesive to interfere with payout of the optical fiber and increase the payout force, but the disadvantage that there is no secondary mechanism to aid in retaining integrity of the optical fiber pack when the canister is subjected to extremely high vibration or thermal loadings, and to resist payout of multiple turns.

In the second regime, a small amount of adhesive is present on the optical fiber. This regime includes adhesive levels sufficient to produce peel forces from about 0.01 grams to about 2 grams. The qualitative presence of some adhesive provides lubricity during payout and a secondary mechanism for retention of the integrity of the optical fiber pack in extreme conditions and to resist payout of multiple turns. On the other hand, even a small amount of the adhesive could possibly interfere with payout through an opening or tube, but it has been determined that amounts of adhesive sufficiently small that the peel force is about 0.01 to 2 grams is acceptable in such applications. Thus, the present invention provides for reduced adhesive on the optical fiber as compared with prior approaches, and provides a choice of adhesive content regimes for various conditions.

Avoiding the use of adhesive or reducing the amount of adhesive over that previously used has important advantages in the stability and performance of the optical fiber system using the inside-payout canister configuration. The adhesives normally used are organic-based materials whose physical properties vary with temperature, environment (e.g., moisture in the air), and even over extended periods of time at a single temperature. As a result, the payout properties, particularly the payout peel force, can vary widely after extended storage and depending upon the temperature of payout. To minimize the variations, the adhesives are carefully formulated, and strict, costly quality control over formulation and method of application are required. Even with the best quality control practices, there may be unacceptable variations in adhesive properties that affect the characteristics of the optical fiber canister both in the as-wound and as-stored conditions.

Historically, optical fiber canisters for missiles that fly through the air at speeds of at least a hundred meters per second have evolved from outside-payout canister configurations. Adhesives have been necessary with such canisters to prevent multiple turns from paying out at once, because experience has shown that multiple-turn payouts often lead to snarls and failure of the optical fiber. Adhesives were also thought to lubricate the optical fiber in the event that it contacted some piece of structure as it was paid out. The centrifugal force applied to the optical fiber as it is payed out from an outside-payout bobbin may well cause it to contact the canister wall or other structure, and the lubricating effect of the adhesive may be helpful in outside-payout bobbins. The use of adhesives such as paraffin with inside-payout bobbins is discussed, for example, in U.S. Pat. No. 4,326,657, at col. 1, lines 55-59.

The present invention also provides a method for preparing an inside-payout optical fiber canister. In accordance with this aspect of the invention, a method of preparing an optical fiber canister includes the step of winding an optical fiber pack on the exterior surface of a winding form, there being applied to the optical fiber of the optical fiber pack during the step of winding an amount of adhesive ranging from zero to an amount sufficient to produce a peel force of less than about 2 grams. Desirably, a release layer of a release material such as polytetrafluoroethylene is applied to the outer surface of the optical fiber pack. The winding form and optical fiber pack are placed into the interior of a hollow housing, with a clearance between the exterior surface of the optical fiber pack and the interior surface of the hollow housing. A support layer of a castable and then curable material, such as a silicon elastomer, is cast between the exterior surface of the optical fiber pack and the interior surface of the hollow housing and allowed to cure and harden in place.

The support layer is preferably cast with a shaped form provided at one or both ends of the canister, to form a dam that extends radially inwardly in restraining contact with the optical fiber pack. The dam or dams thereby support the ends of the optical fiber pack to provide it lateral stability and protection at the ends. The dam or dams can have a tapered profile to match a step-back winding arrangement of the optical fiber layers of the optical fiber pack, a square profile, or any other profile that might be advantageously employed. In one configuration, the optical fiber pack has a square profile at one end adjacent a support flange, and a step-back profile at the other end.

The present invention provides a significant advance in the art of optical fiber canisters, particularly for use in missiles and other vehicles propelled through the air at high rates of speed. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
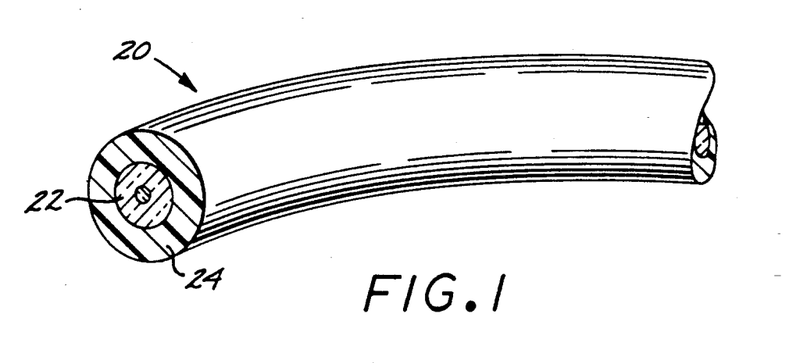
FIG. 1 is a perspective view of an optical fiber.

An optical fiber 20, illustrated in FIG. 1, includes a strand 22 of glass fiber processed so that light transmitted therethrough is subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried along the optical fiber and because the quality of the signal is less subject to external interferences of various types than are electrical signals carried on metallic wires. Moreover, the glass strand 22 is light in weight and made from a highly plentiful substance, silicon dioxide.

The optical fiber 20 is typically fabricated by preparing a preform of glasses of two different optical indices of refraction, one inside the other, and processing the preform to a fiber. The optical fiber 22 is coated with a polymer layer termed a buffer 24 to protect the glass from scratching or other damage. As an example of the dimensions, in a typical configuration the diameter of the glass strand 22 is about 125 micrometers, and the diameter of the optical fiber 20 (the glass strand 22 plus the polymer buffer 24) is about 250 micrometers (approximately 0.010 inches).

Figure 2:
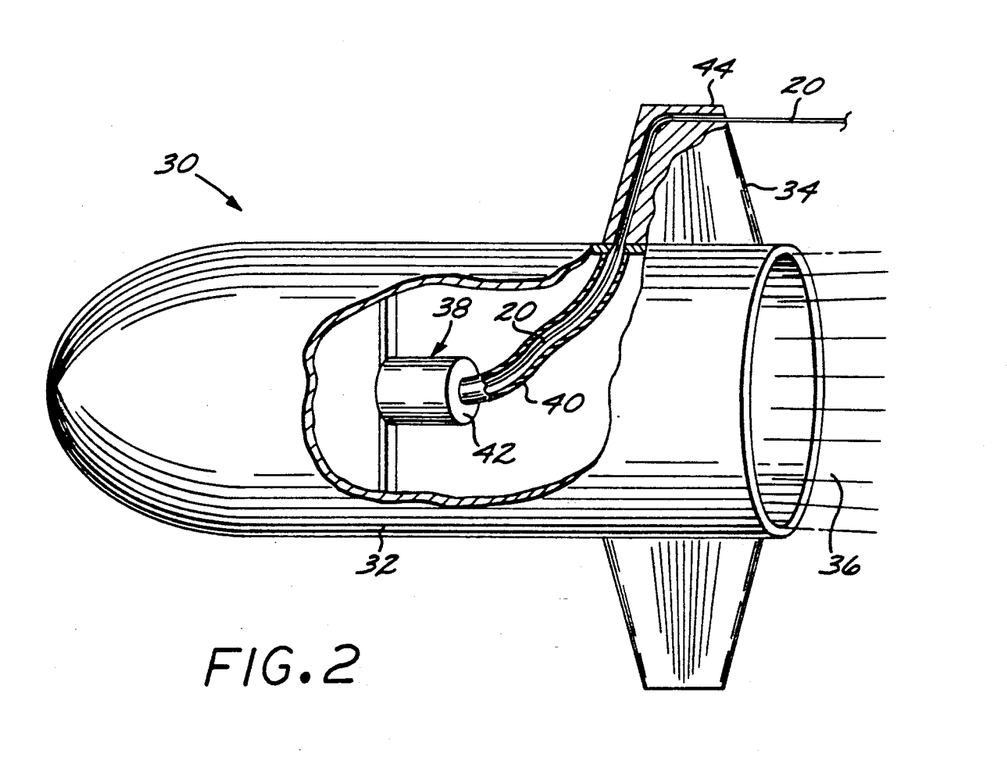
FIG. 2 is a perspective view of a missile guided by signals sent through an optical fiber, with a portion of the skin of the missile broken away to illustrate its interior.

FIG. 2 depicts the general features of optical fiber payout from a missile 30. The missile 30 has a skin 32, outwardly projecting control surfaces 34, and an engine (not shown) that produces an exhaust plume 36. The optical fiber 20 is stored within the missile 30 in a canister 38, whose construction will be described in detail subsequently. The optical fiber 20 extends outwardly from the canister 38 and the missile 30 for connection with apparatus at the launch site (not shown).

In the particular embodiment of FIG. 2, the missile 30 is designed so that the exhaust plume 36 extends straight back from the tail of the missile. The optical fiber 20 therefore cannot be payed out directly to the rear of the missile 30, because it would pass through the hottest part of the exhaust plume 36 and possibly be damaged. To avoid such damage, a duct 40 extends from an end wall 42 of the canister 38, through the interior of the missile 30, and through the interior of one of the control surfaces 34 to an optical fiber release point 44 that is laterally separated from the plume 36. The interior of the duct 40 communicates with the interior of the canister 38. The optical fiber 20 passes from the canister 38, through the duct 40, and away from the missile 30. Ducting of the filament 20 to a release point that is laterally displaced from the exhaust gas avoids damage to the optical fiber 20 by the hot exhaust gas.

The present invention is also applicable to those missiles wherein the engine exhaust plume is not directed out the rear of the missile. In either case, at launch the optical fiber is payed out, maintaining the interconnection for the required part of the flight path.

Figure 3:
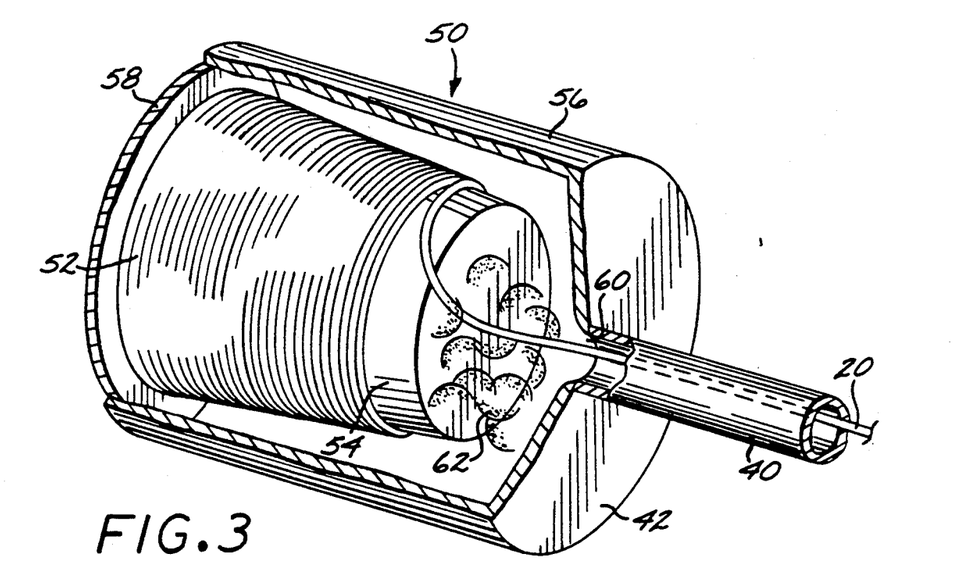
FIG. 3 is a perspective view of an outside payout canister, with a portion of the canister wall broken away to illustrate its interior.

FIG. 3 illustrates a canister 50 that may be used in a missile, having an outside payout configuration. The optical fiber 20 is wound as an optical fiber pack 52 onto the outside surface of a bobbin 54 (hence the term "outside payout" canister) having a tapered cylindrical form with the angle of taper ranging from zero to 5 degrees, and is payed out from that outside surface, as illustrated. An adhesive is applied to the optical fiber either before, during, or after the winding process so that adjacent turns of optical fiber adhere slightly to each other. The amount of adhesive that is used is measured by the force required to pull the optical fiber from the bobbin, the "peel force". Sufficient adhesive is used to provide a peel force of 5-10 grams.

Experience has shown that such an adhesive is necessary for outside payout canisters used to dispense an optical fiber from a missile moving through the air at over a hundred meters per second. Absent such adhesive, the centrifugal forces produced by the helical pattern of the optical fiber as it is payed out cause the optical fiber to lift from the surface of the bobbin prematurely, so that several turns are dispensed at the same time. The usual result is an entanglement of the several simultaneously dispensed turns, causing the optical fiber to pay out irregularly and possibly break.

A hollow enclosure 56 is cylindrical and of such internal dimensions as to enable the bobbin 54 to be secured to a closed end 58 of the enclosure 56, while at the same time providing space for the filament to be taken off the pack without contacting the enclosure walls. The enclosure end wall 42 opposite the closed end 58 includes a small opening or eyelet 60 through which the optical fiber 20 passes as it is dispensed into the duct 40.

As the optical fiber 20 is payed out, it naturally follows a helical pattern because it is wound upon a cylinder. With an outside payout canister 50, it is difficult to reduce the diameter of the helix rapidly so that the optical fiber can pass through the opening 60 and the duct 40. Various mechanical guides and damping media such as an aerosol powder 62 have been utilized to reduce the diameter of the helical pattern.

The outer end of the optical fiber 20 interconnects with apparatus located at the launch site (not shown)

while the other end of the filament is similarly connected to on-board apparatus (not shown). Neither of these apparatus nor the connections thereto are shown since they are conventional and a detailed understanding is not necessary for a full understanding of this invention.

Figure 4:
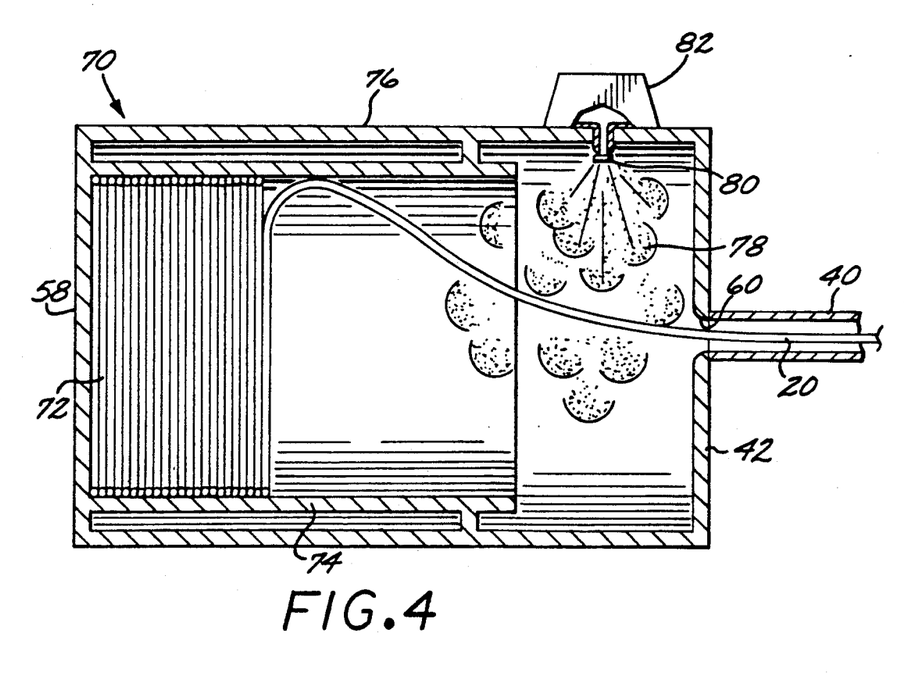
FIG. 4 is a side sectional view of an inside payout canister.

FIG. 4 illustrates an inside payout canister 70 that may be used as the canister 38. (Elements corresponding to structure in the canister 50 are correspondingly numbered.) The inside payout canister 70 has the inherent advantage that the optical fiber 20 is payed out from the inner surface of the optical fiber pack, which is nearer the centerline of the opening 60 than is the outside of the bobbin 54 in the canister 50. In this canister 70, an optical fiber pack 72 is wound on the inside of a housing 74 (hence the term "inside payout" canister), which may be the inside of a canister wall 76 or a separate structure, as shown.

In the prior approaches utilizing an inside payout canister such as that shown, an adhesive in an amount providing 5-10 grams of peel force was applied to the optical fiber 20 in the optical fiber pack 72, for the same reasons as discussed previously for the outside payout canister 50. The helical motion of the optical fiber 20 is reduced as compared to that experienced in the outside payout canister 50, and that helical motion may be even damped further.

In the approach illustrated in FIG. 4, a dense gas 78 is released into the interior of the canister 70 through a nozzle 80. The gas is produced by a gas generator 82. The dense gas reduces the helical motion of the optical fiber 20, so that it may be linearly dispensed through the opening 60 in the end wall 42, and thence into a duct, if provided.

According to the present invention, and contrary to the accepted practice in the industry, it has now been discovered that an inside payout canister may be operated with far less adhesive than previously thought necessary. In fact, the canister may be prepared with no adhesive, and satisfactory payout can be achieved. Moreover, when reduced adhesive is used, there is less (or no) adhesive to be desposited on the inside of the opening 60 or the duct 40, so as to clog them. There is also less (or no) effect of changes in the adhesive that can result due to temperature changes and/or environmental effects.

Figure 5:
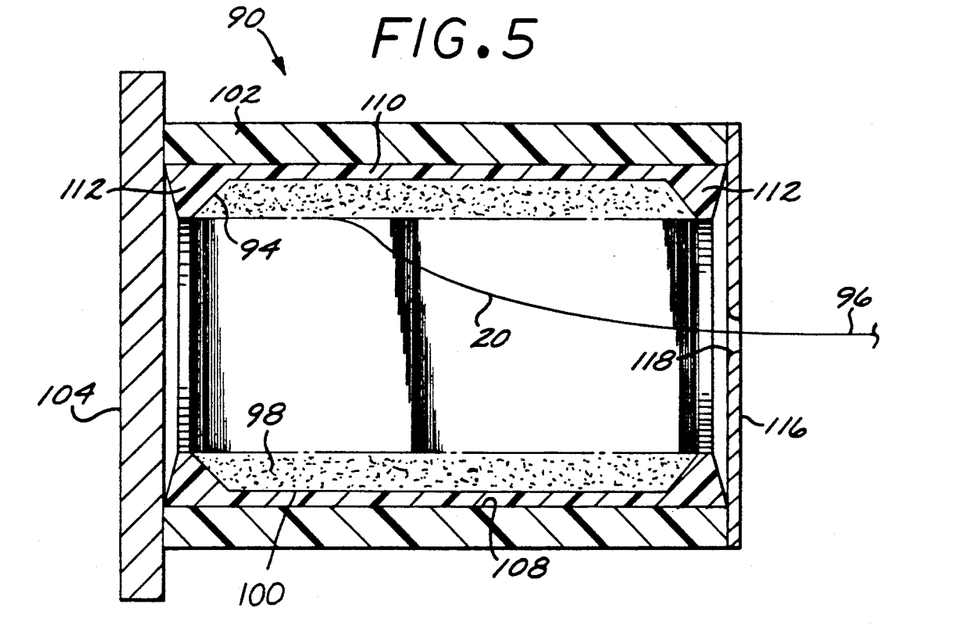
FIG. 5 is a side sectional view of an inside payout canister according to the invention, having a step-back configuration at each end of the fiber pack.
Figure 6:
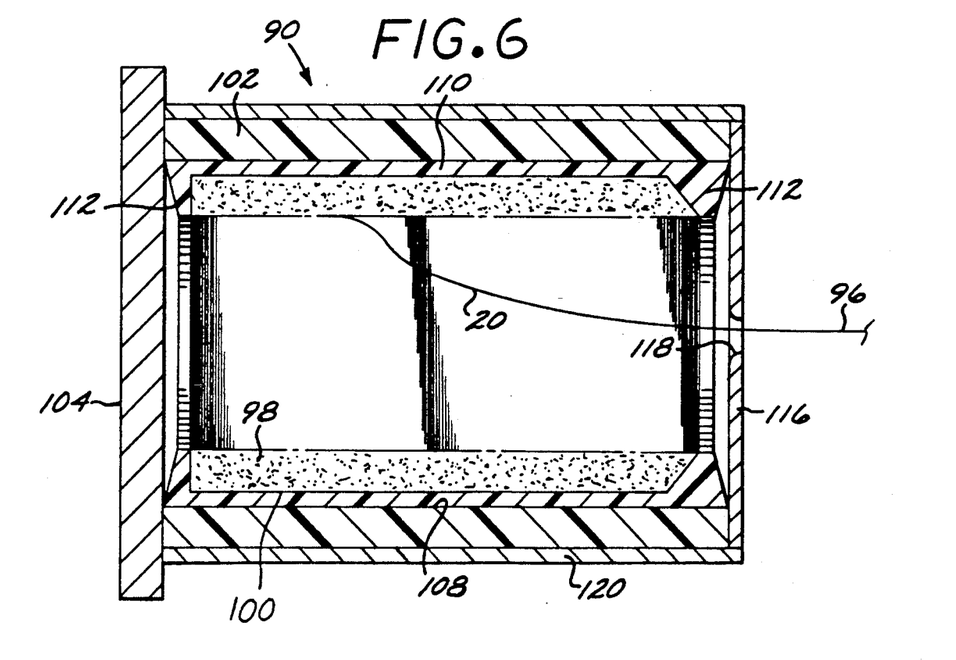
FIG. 6 is a side sectional view of an inside payout canister according to the invention, having a step-back configuration at one end of the fiber pack and a square profile configuration at the other end of the fiber pack.
Figure 7:
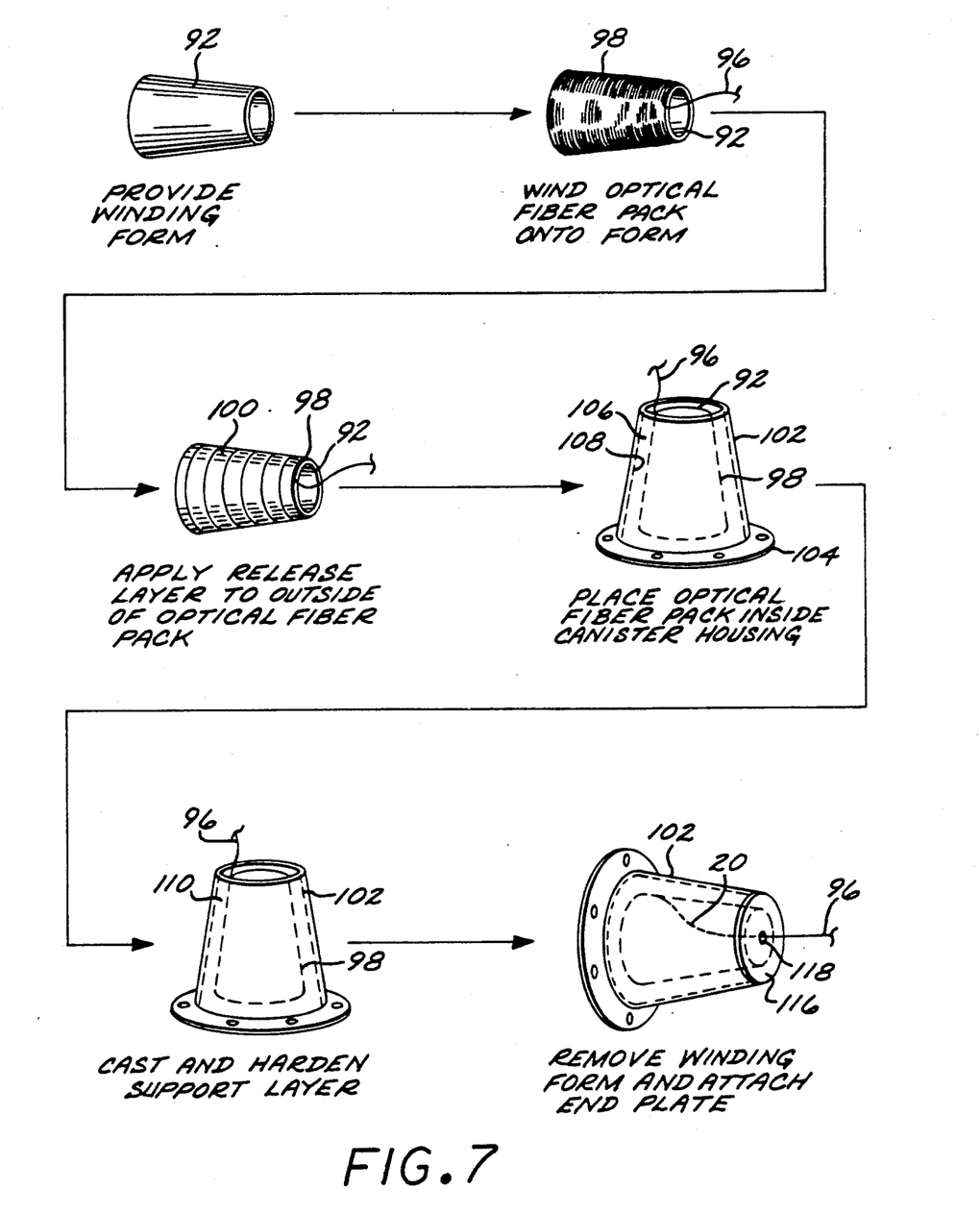
FIG. 7 is a pictorial flow chart of a method for preparing an inside payout canister similar to that illustrated in FIG. 5.

FIGS. 5 and 6 illustrate two preferred forms of inside payout optical fiber canister 90 of the present invention, and FIG. 7 illustrates a method of fabricating such a canister 90. Referring to FIG. 7, a winding form 92 is provided. The winding form 92 is a tapered cylinder having a taper angle of from zero (a true cylinder) to about 5 degrees (a slightly tapered frustum of a cone). The external surface of the winding form 92 defines the inner surface of the optical fiber pack, but the structure of the winding form is otherwise not critical as it is removed during processing.

The optical fiber 20 is wound onto the winding form 92 in a series of side-by-side turns to produce layers of optical fiber. There may be a step-back winding arrangement at the ends of the layers, where each succeeding layer is stepped back slightly from the end of the previously deposited layer. FIG. 5 illustrates the step back of the layers at numeral 94 at both ends of the optical fiber pack. FIG. 6 illustrates a step back at one end of the optical fiber pack and a squared end at the other end of the optical fiber pack. FIG. 7 illustrates a winding pattern where there is no step back at either end of the optical fiber pack. A free end 96 of the optical fiber 20 is extended along the cylindrical axis of the winding form 92. The free end 96 can be tacked down to the next layer of optical fiber material by a small piece of tape, a spot of a weak adhesive, or other sealing material. When the winding is complete, the optical fiber 20 is wound as an optical fiber pack 98 onto the winding form 92.

In one preferred approach, no adhesive is applied to the optical fiber as it is wound onto the winding form 92. In another preferred approach, a small amount of adhesive, sufficient to produce a peel force of from about 0.01 to about 2 grams, may be applied. (The peel force is the force required to pull the optical fiber from the optical fiber pack.) Where adhesive is used, the adhesive can be applied continuously to the optical fiber as it is wound, or discontinuously to each layer after it is completed, or by any other operable technique. The amount of adhesive is much smaller than previously thought necessary. However, if the amount of adhesive is more than required to produce a peel force of about 2 grams, the likelihood of breaking the optical fiber is increased without any substantial improvement in the integrity of the optical fiber or reduction in the likelihood of multiple-turn payouts.

A release layer 100 is applied to the outer surface of the completed optical fiber pack 98, to prevent the outermost layer from becoming bound during the subsequent processing and therefore unavailable for payout. The release layer 100 preferably includes polytetrafluoroethylene in powdered form coated onto the outer surface of the optical fiber pack 98.

The winding form 92, fiber pack 98 wound onto the winding form 92, and overlying release layer 100 are placed into the interior of a hollow housing 102. The housing 102 is oriented with its axis vertical for this step of the process, with the housing 102 and fiber pack 98/winding form 92 sitting on a flat plate 104. The plate 104 and the housing serve as an exterior casting form during fabrication. The plate 104 may be fastened to the housing 102, and, with a bolt pattern in the plate 104 as shown in FIG. 7, may also serve as a means of attachment of the completed canister 90 to the interior structure of the missile 30. If the flat plate 104 is not to be used as part of the attachment structure, it can be separated by any convenient approach, after the casting process is complete.

The housing 102 is dimensioned so that the winding form 92, fiber pack 98, and release layer 100 fit within the housing 102, with a clearance gap 106 between the outside of the release layer 100 and an inside wall 108 of the housing 102. A castable liquid material is poured into the gap 106, filling the gap by gravity feed. The castable material is preferably an organic-based polymeric elastomer, such as a silicon elastomer, that is hardenable by curing. A typical castable material is RTU-11, which is available commercially from General Electric. The castable material is provided as a viscous liquid and poured into the upper end of the gap 106. The castable material then reacts and hardens to form a support layer 110 between the inside of the wall of the housing 102 and the optical fiber pack 98 (or the release layer 100, where provided). The hardened castable material of the support layer 110 traps the outer layers of the optical fiber pack 98 and holds the optical fiber pack 98 in place. The optical fiber pack 98 thereby adheres to the support layer 110 and thence to the housing 102.

The support layer 110 can be a flat, thin layer or, preferably, can extend radially inwardly to form a dam 112 at one or both ends of the canister 90. FIGS. 5 and 6 show a dam 112 at each end of the canister 90. The dam 112 is formed when the castable material hardens in a shape defined by the casting forms. The shape of the dam 112 is defined on the inner side by the winding form 92, on the outer side by the housing 102, on an outer axial end by the casting form, and on an inner axial side by the adjacent optical fiber pack 98. If the optical fiber pack has a step back 94 as shown at both ends of the optical fiber pack in FIG. 5, then the dam will conform to that step back region and provide lateral support to the optical fiber pack. If the optical fiber pack has a squared end configuration, as illustrated at one end in FIG. 6, the dam will conform to that shape. The dam will conform to any other configuration of the optical fiber pack, due to its method of production. The dam 112 therefore provides a laterally (axially) restraining contact against the optical fiber pack 98, acting to hold it in place. The dam at the top end of the canister is formed simultaneously in the casting process, in a similar fashion.

The use of dams 112 on both ends of the fiber pack 98 is preferred. It has been shown in testing of canisters that constraining the optical fiber pack on its outside surface (by the support layer 110 and housing wall and on the ends by the dams 112 is sufficient to maintain the integrity of the fiber pack during handling and testing, without the use of any adhesive. Smooth payout of the optical fiber from this configuration is also achieved. These results are unexpected, as prior practice teaches that an adhesive is necessary to maintain the integrity and payout capability of the optical fiber pack.

After the support layer 110 and dam(s) 112 are formed and solidified, the winding form 92 is removed. The winding form 92 can be removed simply by the "lost fiber" technique of removing the innermost layer of optical fiber from the fiber pack 98 to create a space between the inner surface of the optical fiber pack 98 and the outer surface of the winding form 92, and sliding the winding form out of the housing 102. The innermost layer is removed by pulling on the free end 96 until the entire innermost layer has been removed. In another approach that conserves optical fiber material, the winding form 92 is made to contract or collapse radially inwardly so that it can be removed from the interior of the optical fiber pack.

The housing 102 and its interiorly wound fiber pack 98 can be used as-is, or enclosed within an outer housing 120 shown in FIG. 6. Construction of the canister 90 is completed by attaching an end wall 116 to the end of the housing 102 or the housing 120, if provided. The end wall 116 typically has a small opening 118 therein. The free end 96 of the optical fiber 20 is threaded through the opening 118. The canister 90 may then be attached to the missile structure using any suitable attachment such as a flange, and the optical fiber 20 threaded through the duct 40, if provided.

The canister of the invention may be used with or without the gas or aerosol damping techniques discussed previously.

More than 30 optical fiber canisters like those shown in FIGS. 5 and 6 have been constructed by the approach discussed above and depicted in FIG. 7. Some canisters had no adhesive, and others had from zero adhesive up to an amount sufficient to produce a peel force of about 2 grams. The fabrication was successful, and the canisters could be handled without loss of mechanical integrity of the optical fiber pack. The canisters were tested at payout speeds ranging up to about 300 meters per second. The tests were successful. Ten of the tests were performed with a high density-high pressure gas within the canister, as depicted schematically in FIG. 4, and having ducts with a length to diameter ratio of at least 100 to 1. These payout tests were also completed successfully.

The present invention therefore provides an optical fiber canister and approach for manufacturing an optical fiber canister having important advantages over those previously available. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber canister, comprising:
   a hollow housing; and
   an optical fiber pack consisting essentially of a plurality of layers of optical fiber supported on an inner surface of the housing and having an end of the optical fiber positioned to pay out from an interior surface of the optical fiber pack, at least a portion of the optical fiber having an amount of adhesive thereon sufficient to produce a peel force of from about 0.01 to about 2 grams.

2. The optical fiber canister of claim 1, wherein there is a dam at each end of the optical fiber pack, and wherein a dam at one end has a tapered profile and a dam at the other end has a square profile.

3. An optical fiber canister, comprising:
   a hollow housing; and
   an optical fiber pack consisting essentially of a plurality of layers of optical fiber supported on an inner surface of the housing and having an end of the optical fiber positioned to pay out from an interior surface of the optical fiber pack, at least a portion of the optical fiber having an amount of adhesive thereon ranging from zero to an amount sufficient to produce a peel force of less than about 2 grams; and
   a support layer between the inner surface of the housing and exterior surface of the optical fiber pack.

4. The optical fiber canister of claim 3, wherein the support layer further comprises an inwardly extending dam at both ends of the optical fiber pack in restraining contact with both ends of the optical fiber pack.

5. The optical fiber canister of claim 3, wherein the support layer is formed of an elastomer.

6. The optical fiber canister of claim 3, wherein the support layer is formed of a silicon elastomer.

7. The optical fiber canister of claim 3, further including
   a release layer between an inner surface of the support layer and the exterior surface of the optical fiber pack.

8. The optical fiber canister of claim 7, wherein the release layer includes polytetrafluoroethylene.

9. The optical fiber canister of claim 3, wherein the support layer comprises a castable material.

10. The optical fiber canister of claim 9, wherein the support layer further comprises a curable polymeric material.

11. The optical fiber canister of claim 3, wherein the support layer further comprises an inwardly extending dam adjacent at least one end of the canister in restraining contact with an end of the optical fiber pack.

12. The optical fiber canister of claim 11, wherein the dam has a tapered profile adjacent the optical fiber pack.

13. The optical fiber canister of claim 11, wherein the dam has a square profile adjacent the optical fiber pack.

14. An optical fiber canister, comprising:
a hollow housing, the hollow housing forming a tapered cylinder having an angle of taper of no more than about 5 degrees;
an optical fiber pack consisting essentially of a plurality of layers of optical fiber supported on an inner surface of the housing and having an end of the optical fiber positioned to pay out from an interior surface of the optical fiber pack, at least a portion of the optical fiber having an amount of adhesive thereon ranging from zero to an amount sufficient to produce a peel force of less than about 2 grams.

15. An optical fiber canister, comprising:
a hollow housing;
a support layer between the inner surface of the housing and the exterior surface of the optical fiber pack; and
an optical fiber pack having a plurality of layers of optical fiber supported on an inner surface of the housing and having an end of the optical fiber positioned to pay out from an interior surface of the optical fiber pack, the optical fiber of the optical fiber pack having no adhesive thereon.

16. An optical fiber canister, comprising:
a hollow housing;
a support layer between the inner surface of the housing and the exterior surface of the optical fiber pack; and
an optical fiber pack having a plurality of layers of optical fiber supported on an inner surface of the housing and having an end of the optical fiber positioned to pay out from an interior surface of the optical fiber pack, the optical fiber of the optical fiber pack having an amount of adhesive thereon sufficient to produce a peel force of from about 0.01 to about 2 grams.

17. An optical fiber canister, comprising:
a hollow, tapered cylindrical housing;
an optical fiber pack comprising a plurality of layers of optical fiber supported on an inner surface of the housing and having an end of the optical fiber positioned to pay out from an interior surface of the optical fiber pack, the optical fiber of the optical fiber pack having an amount of adhesive thereon ranging from zero to an amount sufficient to produce a peel force of less than about 2 grams;
a support layer between the inner surface of the housing and the exterior surface of the optical fiber pack, wherein the support layer includes an inwardly extending dam at an end of the canister in restraining contact with an end of the optical fiber pack; and
a release layer between an inner surface of the support layer and the exterior surface of the optical fiber pack.

18. The optical fiber canister of claim 17, wherein the support layer has an inwardly extending dam at both ends of the canister in restraining contact with the ends of the optical fiber pack.

19. An optical fiber guided missile, comprising:
a missile structure including means for propelling the missile structure through the air at a speed of at least about a hundred meters per second; and
an optical fiber canister mounted in the missile structure, the optical fiber canister comprising
a hollow housing, and
an optical fiber pack consisting essentially of a plurality of layers of optical fiber supported on an inner surface of the housing and having an end of the optical fiber positioned to pay out from an interior surface of the optical pack, the optical fiber of the optical fiber pack having an amount of adhesive thereon sufficient to produce a peel force of from about 0.01 to about 2 grams.

* * * * *